(12) United States Patent
Al-Hallaj et al.

(10) Patent No.: US 12,191,469 B2
(45) Date of Patent: Jan. 7, 2025

(54) PHASE CHANGE COMPOSITE APPARATUS FOR BATTERY PACKS AND METHODS OF MAKING

(71) Applicant: BEAM GLOBAL, San Diego, CA (US)

(72) Inventors: Said Al-Hallaj, Chicago, IL (US); De'Nard Harper, Calumet City, IL (US); Hexu Wang, Chicago, IL (US); Scott Morehouse, Hudsonville, MI (US); Reem Khoury, Chicago, IL (US); Hamdi Mohamed, Tinley Park, IL (US); Samuel T. Plunkett, Chicago, IL (US); Dan Bagby, Grand Rapids, MI (US)

(73) Assignee: BEAM GLOBAL, San Diego, CA (US)

( * ) Notice: Subject to any disclaimer, the term of this patent is extended or adjusted under 35 U.S.C. 154(b) by 46 days.

(21) Appl. No.: 17/693,846

(22) Filed: Mar. 14, 2022

(65) Prior Publication Data

US 2022/0302520 A1    Sep. 22, 2022

Related U.S. Application Data

(60) Provisional application No. 63/161,703, filed on Mar. 16, 2021.

(51) Int. Cl.
*H01M 10/659* (2014.01)
*C09K 5/06* (2006.01)
*H01M 50/293* (2021.01)

(52) U.S. Cl.
CPC .......... *H01M 10/659* (2015.04); *C09K 5/063* (2013.01); *H01M 50/293* (2021.01)

(58) Field of Classification Search
CPC .... H01M 10/659; H01M 50/293; C09K 5/063
See application file for complete search history.

(56) References Cited

U.S. PATENT DOCUMENTS 4,317,865 A * 3/1982 Trocciola ............ H01M 8/0295
429/516
10,597,569 B2 3/2020 Razack et al.
(Continued)

FOREIGN PATENT DOCUMENTS

CN         111354879 A * 6/2020 ............. B60L 50/64
WO   WO 2018/136810 A1    7/2018
(Continued)

OTHER PUBLICATIONS

ISA/US, English language verison of the International Search Report, Form PCT/ISA/210, for International Application PCT/US22/20313, Mar. 15, 2022 (05 pages).
(Continued)

*Primary Examiner* — Imran Akram
(74) *Attorney, Agent, or Firm* — Pauley Erickson & Swanson (57) ABSTRACT

A method for making a phase change composite (PCC) for a battery pack of a plurality of electrochemical cells. The method includes impregnating a matrix material with a phase change material, and fragmenting the matrix material before or after the impregnating. The fragmented and impregnated matrix material are shaped into a composite such as by extraction, pressing, or other molding technique. Additional PCC shapes are provided by this invention, such as individual spacers for placement between individual battery cells, or rows of cells.

8 Claims, 8 Drawing Sheets

(56) References Cited

U.S. PATENT DOCUMENTS

| | | | | |
|---|---|---|---|---|
| 2007/0241856 | A1* | 10/2007 | Ohtsuka | H01H 87/00 |
| | | | | 337/159 |
| 2009/0004556 | A1* | 1/2009 | Al-Hallaj | H01M 10/659 |
| | | | | 429/120 |
| 2009/0004566 | A1* | 1/2009 | Shirane | H01M 4/485 |
| | | | | 429/220 |
| 2015/0169015 | A1* | 6/2015 | Yebka | H01M 10/66 |
| | | | | 361/679.54 |
| 2016/0223269 | A1* | 8/2016 | Hartmann | B32B 27/00 |
| 2017/0314835 | A1* | 11/2017 | Howland | F25D 23/068 |
| 2018/0298261 | A1* | 10/2018 | Razack | C08J 5/04 |
| 2020/0235446 | A1* | 7/2020 | Al-Hallaj | H01M 10/44 |
| 2021/0188128 | A1* | 6/2021 | Chopard | B60L 50/64 |
| 2022/0006136 | A1* | 1/2022 | Berdichevsky | H01M 10/643 |
| 2022/0158273 | A1* | 5/2022 | Khateeb Razack | |
| | | | | H01M 10/617 |
| 2022/0166106 | A1* | 5/2022 | Zhang | H01M 50/20 |

FOREIGN PATENT DOCUMENTS

| | | | |
|---|---|---|---|
| WO | WO 2020/117672 A2 | 6/2020 | |
| WO | WO-2020197982 A1 * | 10/2020 | B32B 15/043 |

OTHER PUBLICATIONS

ISA/US, Form PCT/ISA/237, Written Opinion of the International Searching Authority, for International Application PCT/US22/20313, Mar. 15, 2022 (08 pages).

* cited by examiner

| Sample ID | Latent Heat (J/g) | Onset (°C) | Peak (°C) |
|---|---|---|---|
| NEO 12.6# based Thermal Block 1 | 137.32 | 46.73 | 53.77 |
| NEO 12.6# based Thermal Block 2 | 132.94 | 38.73 | 52.27 |
| R-PCC QC AVG | 129.91 | 47.61 | 54.11 |

| Material Property | Target Value |
|---|---|
| Coating material compatibility | Paraffin wax – graphite composite |
| Coating % elongation | >15%, for range of 25°C to 55°C |
| Test breakdown voltage | >1200 V |
| Coating electrical resistivity | $>3 \times 10^7$ Ohm-m |
| Coating thickness | Target <5 mils (0.13mm); Tolerate <20 mils (0.51mm) |
| Coating thickness uniformity | ± 2 mils (0.05mm) |
| Process repeatability | ± 2 mils (0.05mm) |
| Coating lifetime | >10 years |
| Coating end-use temperature | -20°C to 120°C |
| Coating application temperature | Target <55°C; Tolerate <70°C** |
| Flammability | UL94 V0 compliant |

**MATERIAL HANDLING AT <52°C

FIG.14

PHASE CHANGE COMPOSITE APPARATUS FOR BATTERY PACKS AND METHODS OF MAKING

CROSS REFERENCE TO RELATED APPLICATION

This application claims the benefit of U.S. provisional application, Ser. No. 63/161,703, filed on 16 Mar. 2021. The provisional application is hereby incorporated by reference herein in its entirety and is made a part hereof, including but not limited to those portions which specifically appear hereinafter.

FIELD OF THE INVENTION

This invention relates generally to rechargeable battery packs and, more particularly, to phase change composites for temperature regulation in battery packs, and methods of manufacturing said phase change composites.

BACKGROUND OF THE INVENTION

In recent years, lithium-ion (Li-ion) battery packs have been the dominant energy storage system (ESS) in electrified transportation applications.

Temperature regulation is key to using such battery packs, and the use of phases change materials, such as wax, are used to store and release heat. The phase change materials are known to be supported by matrix materials, such as an encapsulated wax material in a graphite matrix, collectively referred to as a phase change composite (PCC). There is a continuing need for improved battery systems, and improved temperature regulation materials.

SUMMARY OF THE INVENTION

A general object of the invention is to provide improved phase change composites, such as for use in temperature regulation of battery packs, and also new composite configurations, such as battery cell spacers, formed by the method.

The general object of the invention can be attained, at least in part, through a method for making a phase change composite for a battery pack of a plurality of electrochemical cells. The method includes impregnating a matrix material with a phase change material, and fragmenting the matrix material either before or preferably after the impregnating. The fragmented and impregnated matrix material is then shaped into a shaped composite for use in battery cell arrays. For example, the shaped composite can be placed between at least two battery cells in the battery pack.

In embodiments of this invention, the impregnating step is performed by placing a sheet of the matrix material in a bath of the phase change material. Exemplary matrix materials include graphite and exemplary phase change materials include paraffin or other wax, hydrated salts, fatty acids, hydrogenated bio-oils, or other phase change materials. Presently preferred phase change material baths include a liquified wax bath.

In embodiments of this invention, the fragmenting step includes a grinding, grating, shredding, and/or cutting process. The shaping step can include a molding, pressing, stamping, thermoforming, extrusion, and/or casting process. The shaped composite desirably includes plurality of battery seats, each for one of the plurality of electrochemical cells. For example, the shaped composite can be a conventional PCC block, with cell cylinder openings formed during or after molding. The shaped composite can also be a spacer comprising a plurality of open-faced (i.e., not 'closed' tube cylinders) battery seats on one or both sides of the shaped composite. The shaped composite can also include irregularly shaped cavities designed to mate with pouch-, prismatic-, or otherwise geometrically-shaped cells.

The shaped composite can be coated or encapsulated, such as to further support the shaped structure and/or help contain the phase change material. The coating or encapsulating can be performed by spray coating, dip coating, and/or chemical vapor deposition. In other embodiments, a preformed outer shell, such as made of a polymer material and matching the shape of the internal composite, is used to encapsulate the shaped composite. The coating or encapsulation can be integral to the forming process or may be apply to the shaped composite post-forming.

The invention further includes a method impregnating a matrix material with a phase change material, and fragmenting the impregnated matrix material into small, moldable fragments. The fragmented and impregnated matrix material is then shaped into a shaped composite for use in battery cell arrays. The matrix material can be expanded graphite, desirably formed into sheets which are then soaked in a liquid/melted wax bath to impregnate the matrix material with the wax. The impregnated sheets are then fragmented, and the resulting fragment material is shaped, such as by a screw extruder or other suitable molding or forming device The invention further includes a phase change composite spacer for a battery pack of a plurality of electrochemical cells. The spacer includes a molded spacer body formed of a matrix material with an impregnated phase change material. The spacer also includes a plurality of open-faced battery seats on at least one side of the spacer body. For some uses, the spacer body includes open-faced battery seats on two opposing sides of the spacer body. The matrix material comprises graphite particles impregnated with the phase change material, and held together by an internal binder material and/or a surface coating of polymer or other suitable material.

The invention further includes a battery pack including a plurality of electrochemical cells and a molded thermal management composite, such as discussed above. The molded thermal management composite including a matrix impregnated with a phase change material of any of the embodiments disclosed herein, and disposed between the electrochemical cell elements. The molded thermal management composite is preferably shaped of compressed impregnated matrix fragments.

Other objects and advantages will be apparent to those skilled in the art from the following detailed description taken in conjunction with the appended claims and drawings.

DESCRIPTION OF THE INVENTION

The present invention includes a method of forming phase change composites, such as for use in temperature regulation of battery packs, and also new composites shapes, such as battery cell spacers, formed by the method. Generally stated, the invention molds or otherwise forms a phase change composite from small pieces of matrix material that each include, such as by impregnation, a phase change material. Exemplary matrix materials include graphite and exemplary phase change materials include paraffin or other wax, hydrated salts, fatty acids, hydrogenated bio-oils, or other phase change materials.

Figure 1:
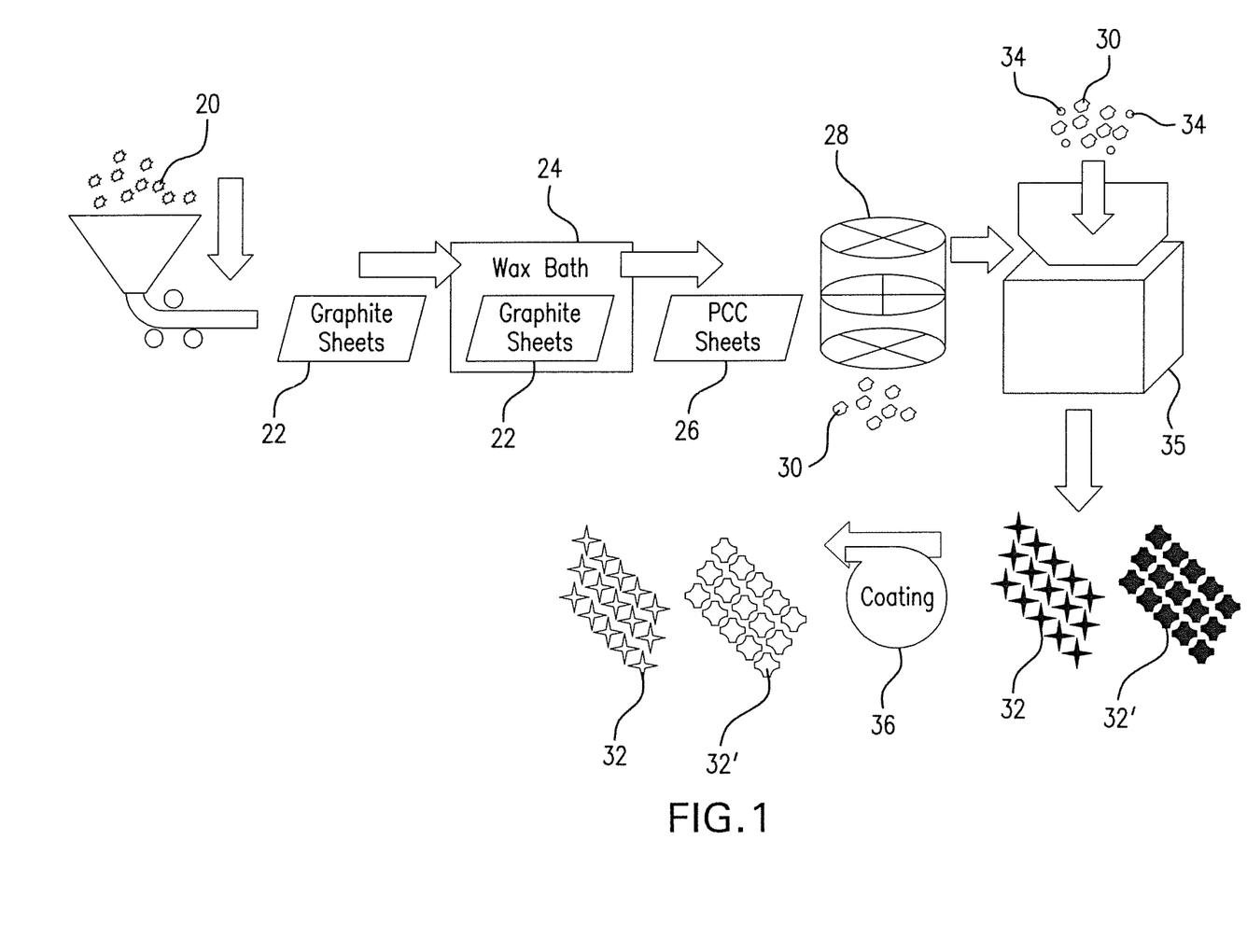
FIG. 1 schematically illustrates a method of forming a phase change composite material according to one embodiment of this invention.

In embodiments of this invention, a desired temperature regulation material, such as a phase change material, is interspersed in a base matrix material. Referring to FIG. 1, a graphite matrix material 20, such as expanded graphite made by expansion methods known in the art, is formed into a sheet 22. The compression of the material 20 to sheet 22 is likewise performed using any known compression process. The graphite matrix material sheet 22 is impregnated with a phase change material, such as wax. In the illustrated embodiment of FIG. 1, the impregnation is performed by soaking the graphite sheet 22 in a liquid wax bath 24 for a necessary time, followed by any necessary cooling/solidifying of the wax. Other methods of impregnation can be used, such as spraying or mixing the phase change material with the graphite in the sheet forming process.

The impregnated graphite sheet 26, namely a phase change composite material, is then fragmented into small, impregnated matrix material pieces. The fragmenting can be done by any suitable fragmenting process 28, such as, without limitation, grinding, grating, shredding, and/or cutting. In other embodiments of this invention, the impregnating is performed by, for example, soaking graphite fragments after shredding or without any sheet formation, but impregnating larger material forms followed by fragmenting can be beneficial for processing and handling.

Referring to FIG. 1, the shredded phase change composite (PCC) particles 30 are shaped in a molding press 35 to form a shaped composite, illustrated as various spacer elements 32 or 32' discussed further below. Any suitable forming process can be used to shape the PCC particles, such as, without limitation, molding (e.g., injection molding), pressing, stamping, thermoforming, extrusion (screw extrusion, articulating piston extrusion, rotary dial extrusion, etc.), and/or casting. In embodiments of this invention, a 'cold' press is used, with less heating (e.g., no preheating) and/or using a single press step, to reduce wax melt/loss, and reduce or eliminate bubbles and/or cracks in the shaped composite.

In embodiments of this invention, as illustrated in FIG. 1, the PCC particles are mixed with an optional, suitable binder material 34. PCC binders can be, without limitation, polymer-, ceramic-, metal-, and/or carbon-based materials. PCC binders can be used to strengthen PCC mechanical properties, to improve compressive strength, hardness, and/or reduce expansion/shrinkage. PCC binders can also reduce or eliminate wax mobility in PCC composites, and/or reduce or eliminate wax leakage from PCC spacers. PCC binder additives will generally be in small quantities and could be <10% of the composite mix, preferably 2-5%. Other additives can be added depending on need, such as cut or continuous support fibers or thermal enhancement additives/elements.

Figure 14:
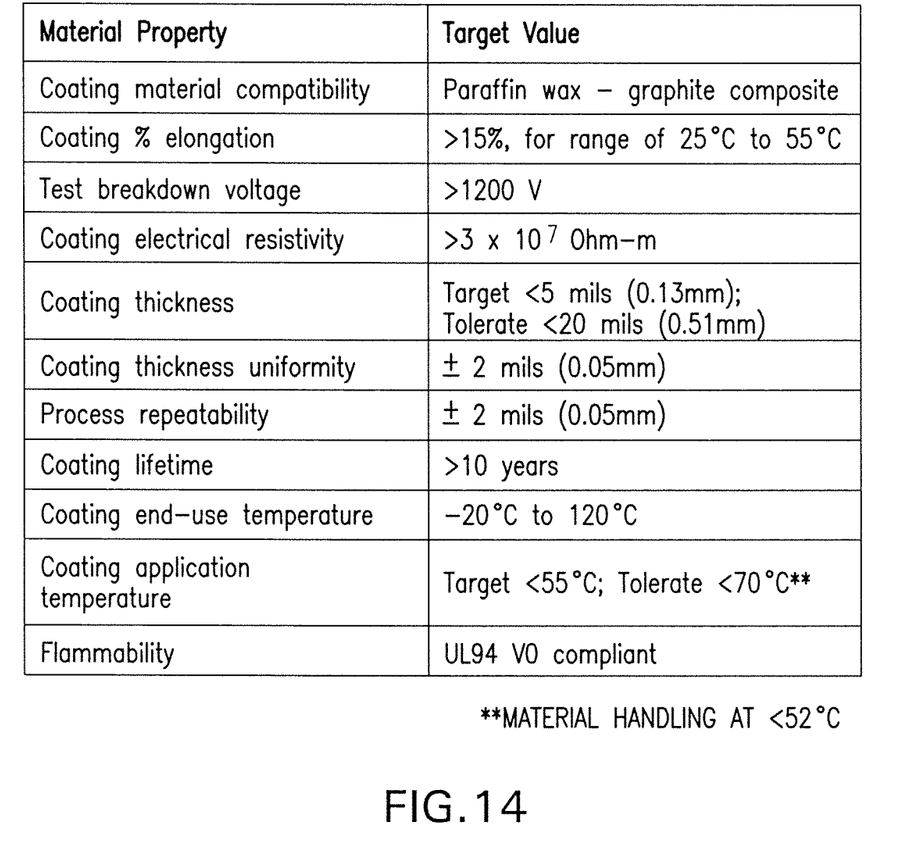
FIG. 14 summarizes coating material preferences according to embodiments of this invention.

In embodiments of this invention, the formed, shaped PCC composite 32, 32' is further coated. The coating can include any suitable coating or encapsulation process 36, such as, without limitation, spray coating (e.g., electrostatic, powder, pressurized, etc.), dip coating (e.g., pouring), and/or chemical vapor deposition. Exemplary coating materials, include, without limitation, polyurethane, epoxies, silicones, rubbers, and combinations thereof, including any suitable additives, such as UV protectants. The coating desirably assists in improving thermal management properties (e.g., keeping wax in the PCC), improves mechanical strength (e.g., reduce cell double shrinking, cracking, etc.), and/or provides dielectric insulation between the individual battery cells. The coating can further improve cell insertion, reduce matrix flaking, provide protection (e.g., UV), and otherwise improve pack handling. Exemplary coating parameters according to some embodiments of this invention are shown in FIG. 14.

The methods of this invention allow for improved PCC composite formation, particularly for non-conventional shapes. The invention includes a battery pack including a plurality of electrochemical cells and a molded thermal management composite including a matrix impregnated with a phase change material, disposed between the electrochemical cell elements. The molded thermal management composite is shaped of compressed impregnated matrix fragments.

Figure 2:
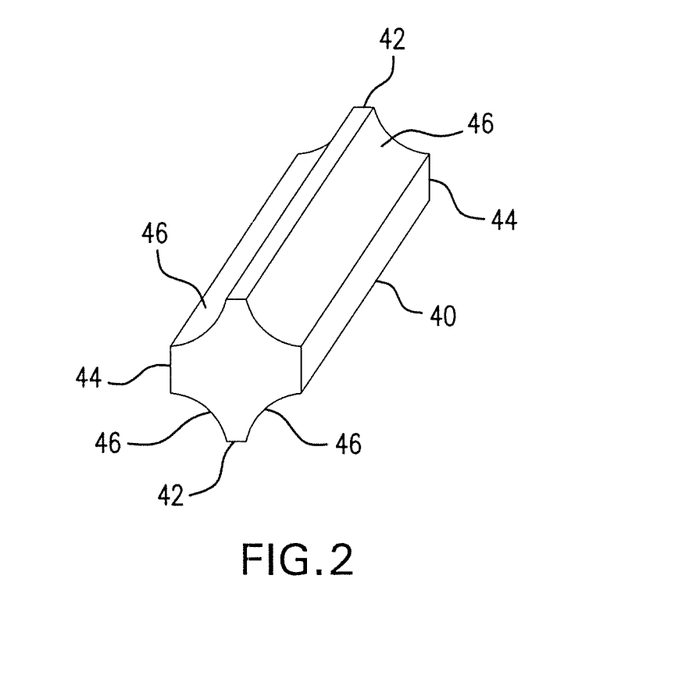
FIG. 2 shows a phase change composite spacer according to one embodiment of this invention.
Figure 3:
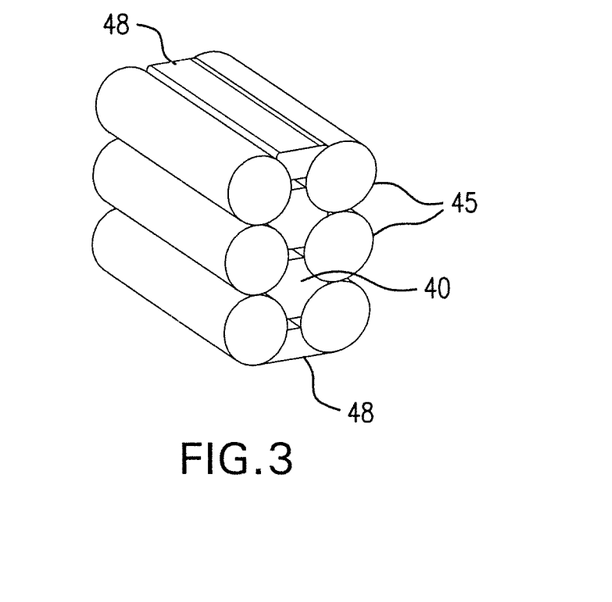
FIG. 3 shows phase change composite spacers in a battery pack array according to one embodiment of this invention.
Figure 4:
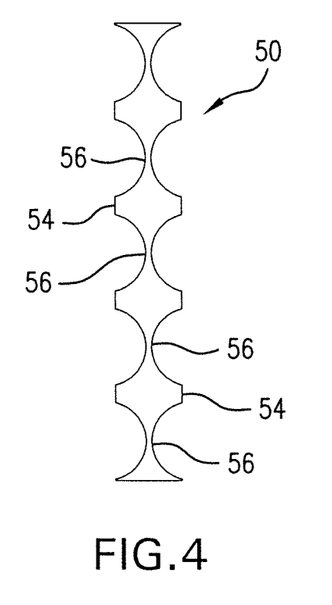
FIG. 4 is a side view of a phase change composite spacer according to one embodiment of this invention.
Figure 5:
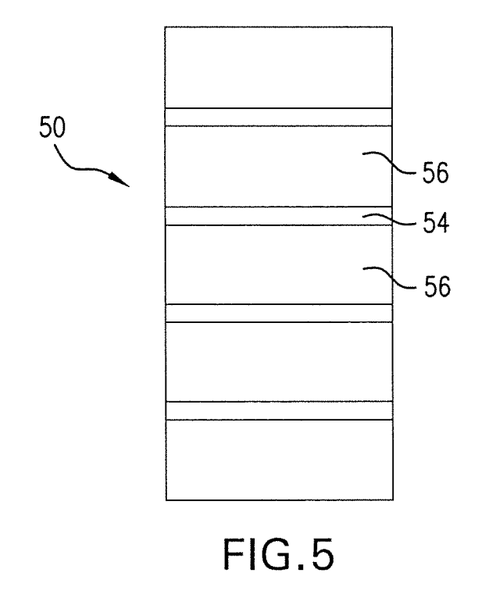
FIG. 5 is a front view of the phase change composite spacer according to FIG. 4.
Figure 6:
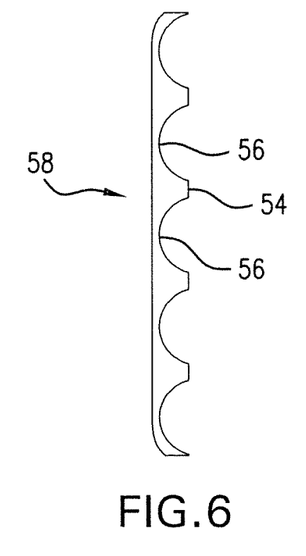
FIG. 6 is a side view of a phase change composite spacer according to one embodiment of this invention.
Figure 7:
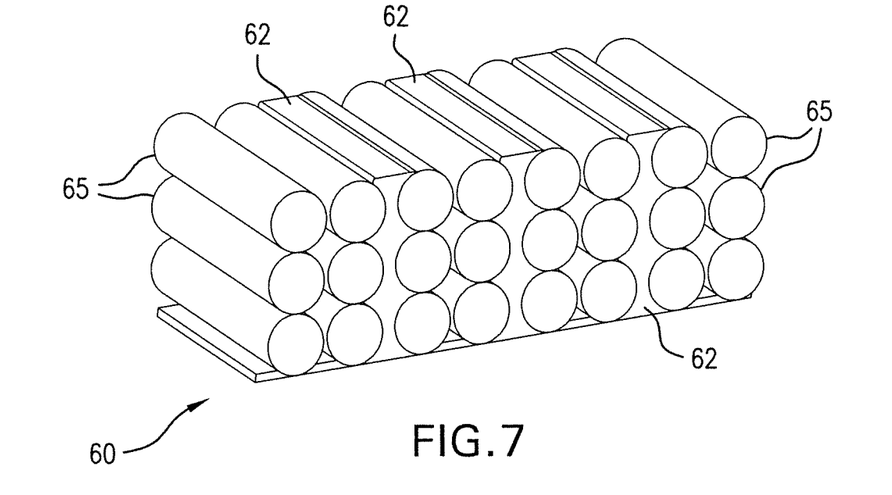
FIG. 7 shows phase change composite spacers in a battery pack array according to one embodiment of this invention.

FIGS. 1 to 8 show various PCC spacers according to embodiments of this invention. The spacer is formed to fit between adjacent battery cells, in situations where a full enclosure around the longitudinal side of the battery cell is not needed or desired, such as due to size and/or air flow needs. PCC matrices of embodiments of this invention include a plurality of battery seats, each correspondingly formed for one of the plurality of electrochemical cells. In the full blocks shown in FIG. 9, each seat is a cylindrical, tubular opening to receive a cell. As shown in FIGS. 2 and 4-6, the spacers according to embodiments of this invention include a partial, or 'open-face' seat, and do not fully surround the corresponding longitudinal side of the cell. As shown in FIGS. 3 and 7, the spacers can be placed between arrays of cells. As shown in FIGS. 2 and 5, the spacer can include the open seats on one or both sides. Exemplary, non-limiting measurements are shown for illustrative purposes. As will be appreciated, various shapes, sizes, and configuration as available for the spacers according to embodiments of this invention, depending on need. As shown in FIGS. 2 and 3, the spacers are designed to fit between four cells, aligned in a square array, with each cell at a 'corner' of the spacer. The seats can be sized or shaped depending on the battery cell.

FIG. 2 shows a perspective view of a spacer 40 according to one embodiment of this invention. Spacer 40 generally has an X-shaped cross section of two perpendicular longitudinal ridges 42 and 44. An open battery cell seat 46 extends between each of adjacent ridges 42 and 44. FIG. 3 shows the spacers 40 used in a battery array, where each spacer 40 is placed at an intersection of four battery cell 45, and one battery cell 45 sits in each spacer seat 46. In the embodiment shown, the longitudinal ridge 44 is wider than longitudinal ridge 42, thereby creating a different spacing between rows of cells in a first axis direction versus rows of cells in a second axis direction. FIG. 3 also shows end spacers 48, having only two cell seats for placement along the edges of the battery array.

FIGS. 4 and 5 show an additional embodiment of a spacer 50 for placement between rows of battery cells, such as shown by the embodiment of FIG. 7. The spacer 50 is designed to extend in one-piece along the entire rows of battery cells 55. The spacer 50 has two opposing sides or faces, each with a plurality of open seats 56 separated by a longitudinal ridge 54. FIG. 6 shows another end spacer 58, having cell seats 56 on only one side of the spacer 58, such as for covering the last row of cells in the battery array.

FIG. 7 shows a battery cell array 60 of a battery pack. Spacers 62, similar to that shown in FIG. 4 can be placed between each row of battery cells 65, or between selected rows as shown, depending on need. Different combination of spacer shapes, such as also including the spacers 40 from FIG. 2 in alternating rows can be used, depending on need.

Figure 8:
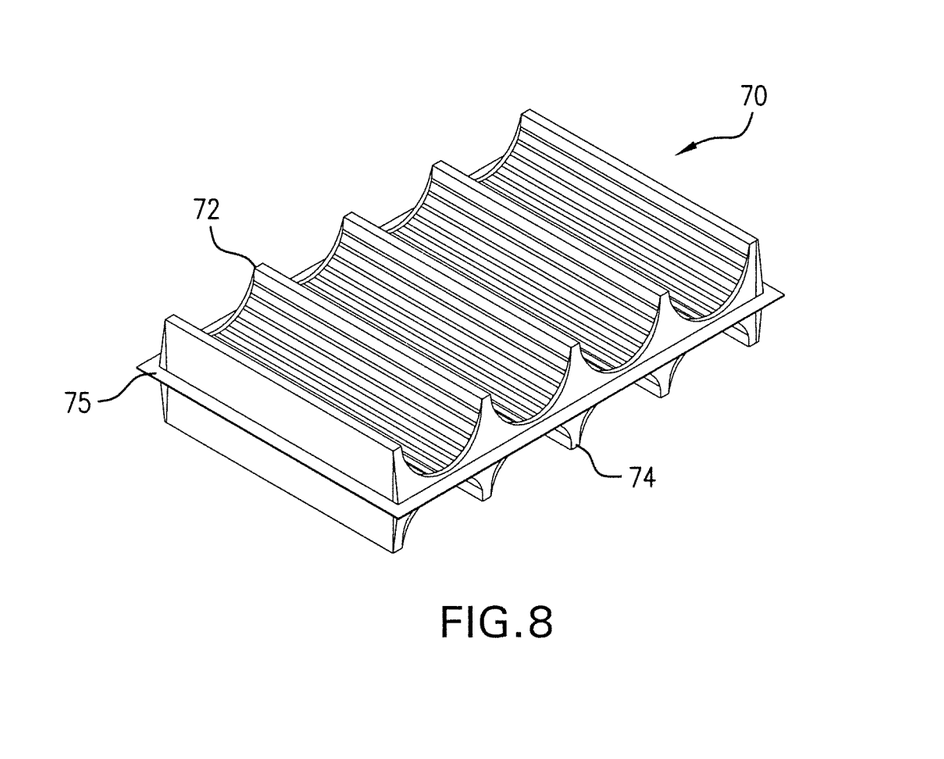
FIG. 8 is a perspective view of a phase change composite spacer according to one embodiment of this invention.

In embodiments of this invention, the shaped composite is further encapsulated or otherwise contained in a pre-formed outer shell, such as to keep wax material from melting and leaking off from the composite. FIG. 8 shows an encapsulated PCC in an outer polymer shell 70, having a corresponding or matching shape to the contained PCC. The shell 70 is formed of two halves 72 and 74, which can be sealed together at rim 75. The shell 70 can also be vented, depending on need, such as an unsealed portion at the rim 75, or on any surface. The shell can also be sized to allow for material expansion within the shell, such as by including small gaps between the interior shell and the PCC. The shell can be formed of any suitable polymer material, such as PVC.

Figure 9:
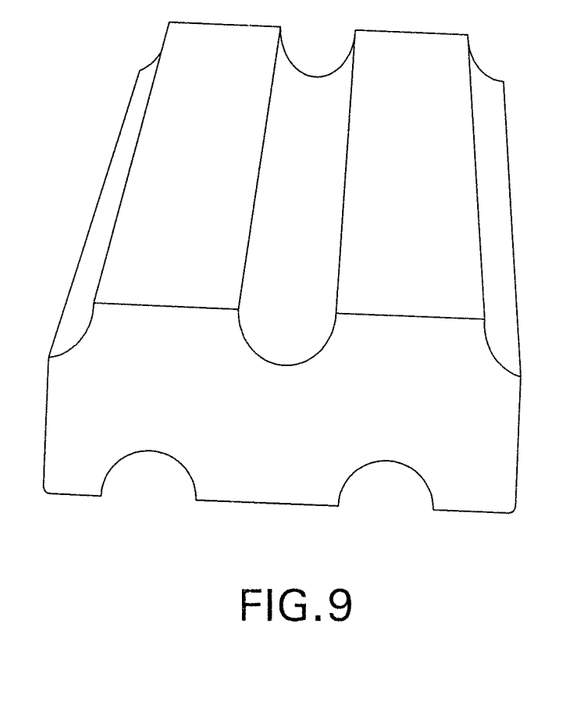
FIG. 9 is a perspective view of a phase change composite spacer according to one embodiment of this invention.

As will be appreciated, various sizes, shapes, configurations, and/or combinations of spacers, PCC matrix bodies, cell seats, and/or counterpart outer shells are available by this invention, depending on need. FIG. 9 illustrates another exemplary spacer configuration, having offset channel seats.

Figure 10:
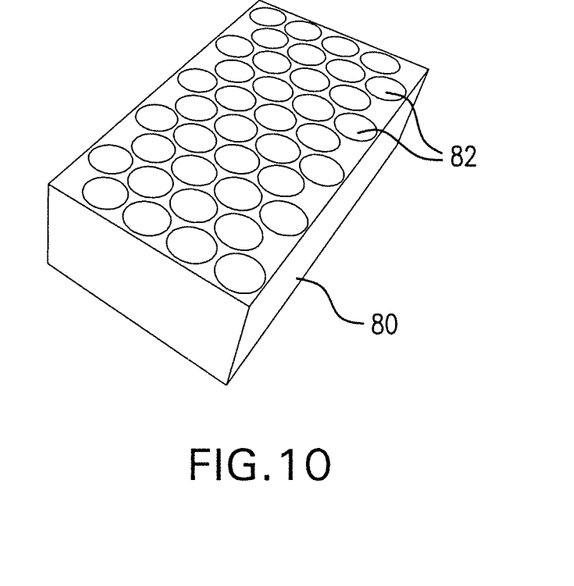
FIG. 10 is a side view of a phase change composite matrix according to one embodiment of this invention.
Figure 11:
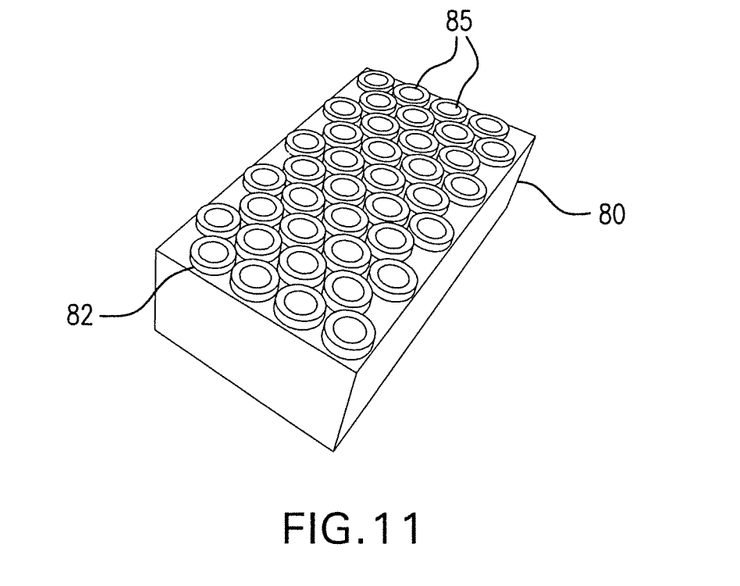
FIG. 11 shows a battery pack using the phase change composite matrix according to FIG. 10.

FIG. 10 shows another exemplary PCC composite 80 with cylindrical battery cell seats 82, formed by mold pressing according to one embodiment of this invention. FIG. 11 shows a battery pack, with battery cells 85 positioned in the seats 82. In one exemplary process used in forming PCC blocks, such as those shown in FIGS. 10 and 11, the block is made at room temperature with a one-press step with pressing lasting about 5 minutes. The PCC blocks can also be machined as needed, such as to form the cell seats, to form the illustrated blocks.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 12:
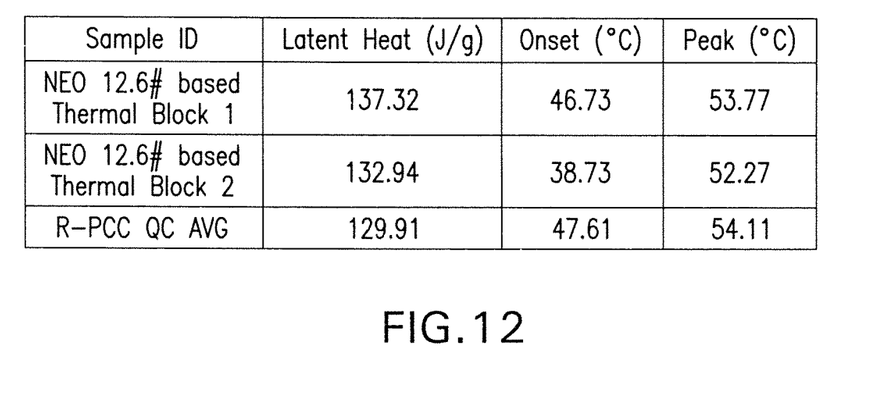
FIGS. 12 and 13 summarize examples according to embodiments of this invention.
Figure 13:
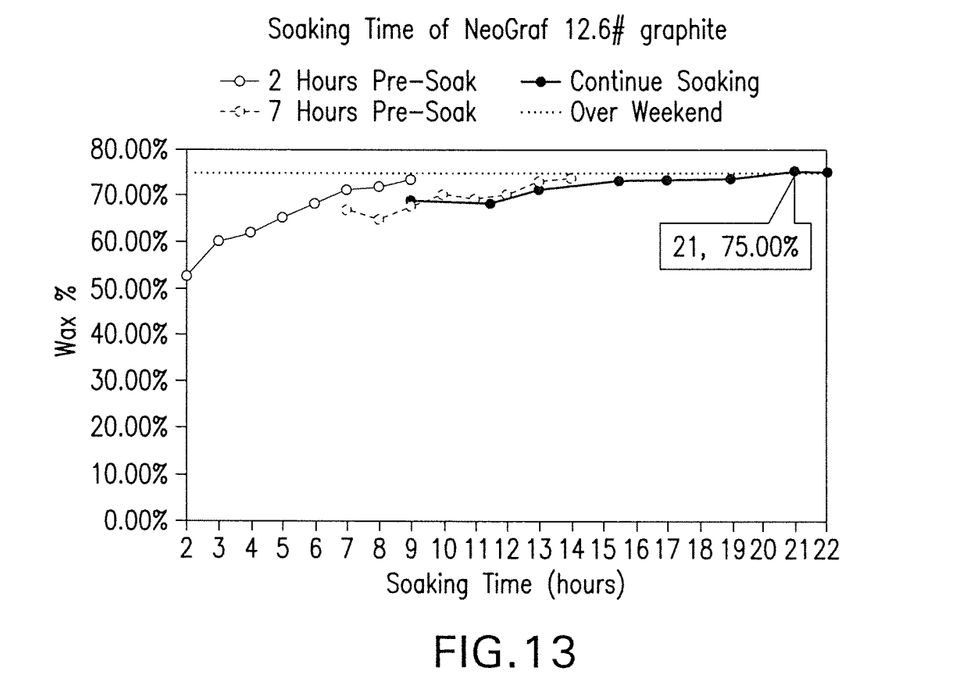

FIGS. 12 and 13 summarize PCC materials made according to embodiments of this invention. For FIG. 3, 200 g/L graphite sheets were soaked in a wax bath and ground into particles. The PCC particles were pressed into a thermal block and then machined to form PCC blocks similar to that shown in FIG. 10. The resulting blocks were compared to a block formed by conventional forming. The latent heat and thermal conductivity were comparable to the control PCC block, and mechanical strength was lower but still within acceptable limits.

FIG. 32 summarizes a soaking study. For the 2-hour pre-soak line, eight sheets of graphite were submerged completely in wax batch. After 2 hours of soaking, one sheet was taken out per hour and weighed. This was repeated with a six-hour presoak, and again for a nine-hour presoak with two-hour measurement intervals. Two sheets were additional left over a weekend to soak, and weighed and averaged. It was estimated that it takes 20 hours for this graphite sheet material to reach 75% impregnation.

Thus, the invention provides a method for making shaped and molded PCC materials for thermal management of battery packs or other installations. The molded PCC materials and spacer shapes provide more flexibility in manufacturing and design of battery packs.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for making a phase change composite for a battery pack of a plurality of electrochemical cells, the method comprising:
    impregnating a sheet of a matrix material with a phase change material by soaking a sheet of the matrix material in a bath of the phase change material, wherein the sheet of matrix material comprises an expanded graphite sheet;
    fragmenting the sheet of matrix material into impregnated matrix material pieces;
    mixing the impregnated matrix material pieces with binder material particles to form a composite mix, wherein the binder material particles form 2% to 5% of the composite mix;
    placing the composite mix into a screw extruder;
    screw extruding the fragmented and impregnated matrix material within the screw extruder into a shaped composite corresponding to an extruder shape, wherein the shaped composite is a spacer having at least two battery seats on each of two opposing sides of the spacer, each of the battery seats of the spacer is an open face seat that does not fully surround a corresponding cell of the battery pack, and
    the spacer retains the extruder shape for use with the battery pack;
    coating the spacer with a polymer coating material selected from a polyurethane, an epoxy, a silicone, a rubber, and combinations thereof.

2. The method of claim 1, further comprising placing the spacer between at least four battery cells in the battery pack.

3. The method of claim 1, wherein the phase change material comprises liquifiable wax.

4. The method of claim 1, wherein the fragmenting comprises grinding, grating, shredding, and/or cutting.

5. The method of claim 1, wherein the spacer comprises an X-shaped cross section.

6. The method of claim 1, wherein each battery seat is curved between two perpendicular longitudinal ridges of the spacer.

7. The method of claim 6, wherein a first ridge of the two perpendicular longitudinal ridges is wider than a second ridge of the two perpendicular longitudinal ridges.

8. The method of claim 1, wherein the spacer is configured to extend in one-piece between two rows of battery cells, and the spacer has two opposing faces, each with the at least two battery seats each separated by a longitudinal ridge.

* * * * *